(12) United States Patent
Fulkerson et al.

(10) Patent No.: US 9,075,538 B2
(45) Date of Patent: Jul. 7, 2015

(54) PERFORMANCE AND POWER MANAGEMENT FOR ROTATING DATA STORAGE DEVICE

(71) Applicant: Seagate Technology LLC, Cupertino, CA (US)

(72) Inventors: Christopher Ryan Fulkerson, Longmont, CO (US); Lingzhi Yang, Firestone, CO (US); Kenneth Lawrence Barham, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 94 days.

(21) Appl. No.: 13/925,529

(22) Filed: Jun. 24, 2013

(65) Prior Publication Data

US 2014/0379940 A1 Dec. 25, 2014

(51) Int. Cl.
*G06F 3/00* (2006.01)
*G06F 3/06* (2006.01)

(52) U.S. Cl.
CPC ............ *G06F 3/0659* (2013.01); *G06F 3/0625* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,877,070 B2 | 4/2005 | Espeseth et al. | |
| 7,010,653 B2 * | 3/2006 | Uchida et al. | 711/158 |
| 7,010,711 B2 | 3/2006 | Bashford et al. | |
| 7,224,543 B1 | 5/2007 | Abrishamchian et al. | |
| 7,362,535 B2 | 4/2008 | Kumano | |
| 7,477,477 B2 | 1/2009 | Maruchi et al. | |
| 7,694,026 B2 | 4/2010 | Huffman | |
| 7,746,591 B2 * | 6/2010 | Escobar-Bowser | 360/68 |
| 7,913,108 B1 | 3/2011 | French et al. | |
| 8,090,902 B1 * | 1/2012 | Bennett et al. | 711/111 |
| 8,315,006 B1 | 11/2012 | Chahwan et al. | |
| 8,364,863 B2 | 1/2013 | McGowan | |
| 8,364,992 B2 | 1/2013 | Guthrie et al. | |
| 8,417,839 B1 * | 4/2013 | Ng et al. | 710/10 |
| 2003/0084261 A1 | 5/2003 | Byrd et al. | |
| 2008/0209103 A1 | 8/2008 | Haga | |
| 2010/0271725 A1 | 10/2010 | Kim | |

FOREIGN PATENT DOCUMENTS

| EP | 2004/023303 A1 | 3/2004 |
|---|---|---|
| EP | 1965385 A1 | 9/2008 |

* cited by examiner

*Primary Examiner* — Idriss N Alrobaye
*Assistant Examiner* — Richard B Franklin
(74) *Attorney, Agent, or Firm* — Hall Estill Attorneys at Law

(57) ABSTRACT

A data storage device may generally be directed to a buffer that stores a plurality of command requests pending for a data storage medium and a processor that is configured to skip a first command request and execute a second command request in response to the second command request having an access latency within a first predetermined performance impact range and a power consumption within a second predetermined power savings range compared to the first command request.

20 Claims, 4 Drawing Sheets

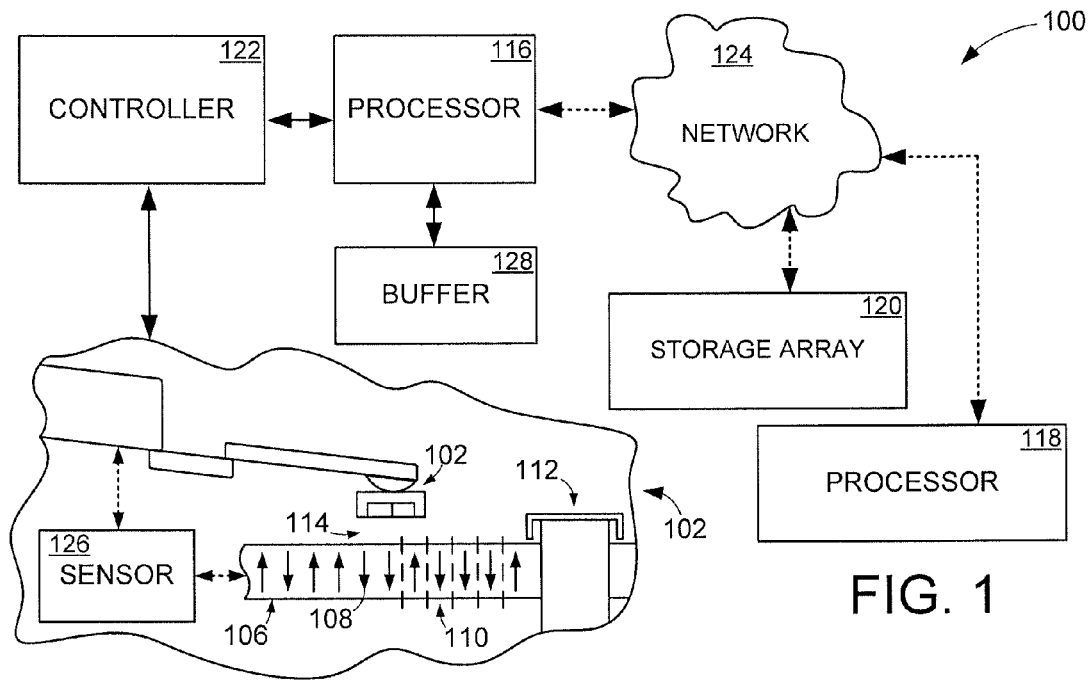
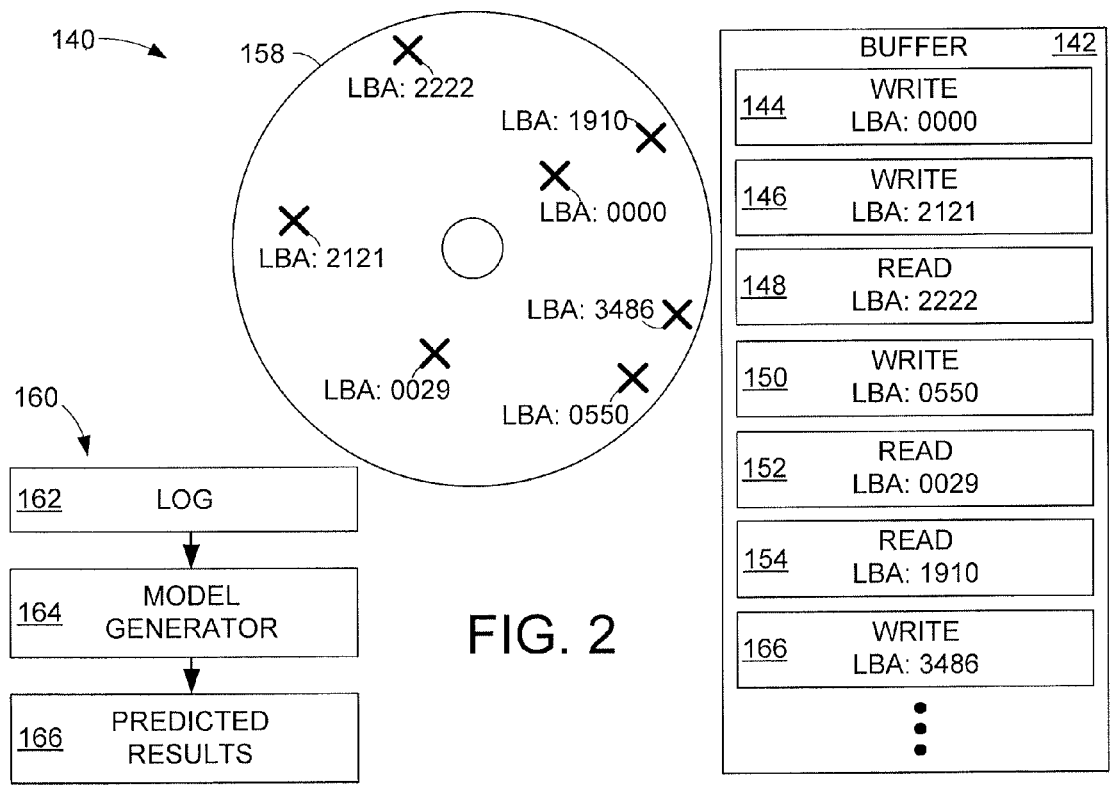
FIG. 2

MAXIMUM PERFORMANCE IMPACT: 10%

MINIMUM POWER BENEFIT: 5%

| COMMAND REQUEST | PREDICTED ACCESS LATENCY (sec) | PREDICTED POWER (W) |
|---|---|---|
| 1 | .006 | 10.2 |
| 2 | .0062 | 10.18 |
| 3 | .0065 | 9.4 |
| 4 | .072 | 8.6 |
| 5 | .008 | 10 |
| 6 | .0082 | 8.8 |
| 7 | .009 | 8.4 |
| 8 | .0098 | 7.8 |

| PROCESSOR LOGIC 184 | |
|---|---|
| 1 | PENDING |
| 2 | PENDING |
| 3 | PENDING |
| 4 | EXECUTE 3 |
| 1 | PENDING |
| 2 | PENDING |
| 4 | EXECUTE 2 |

FIG. 3

| COMMAND REQUEST | PREDICTED ACCESS LATENCY (sec) | PREDICTED POWER (W) |
|---|---|---|
| 1 | .006 | 10.2 |
| 2 | .0068 | 8.9 |
| 3 | .0069 | 9.4 |
| 4 | .070 | 9.3 |
| 5 | .077 | 8.8 |
| 6 | .0082 | 7.9 |
| 7 | .009 | 7.1 |
| 8 | .0098 | 6.3 |

MAXIMUM PERFORMANCE IMPACT: 12%

MINIMUM POWER BENEFIT: 10%

| PROCESSOR LOGIC 194 | |
|---|---|
| 1 | PENDING |
| 2 | EXECUTE 1 |
| 2 | PENDING |
| 3 | EXECUTE 2 |
| 3 | PENDING |
| 4 | EXECUTE 3 |
| 4 | PENDING |
| 5 | PENDING |
| 6 | PENDING |
| 7 | PENDING |
| 8 | EXECUTE 8 |

FIG. 4

| COMMAND REQUEST | PREDICTED PERFORMANCE METRIC | PENALTY |
|---|---|---|
| 1 | 16.2 | 0 |
| 2 | 16.38 | 0 |
| 3 | 15.7 | .5 |
| 4 | 16.4 | 0 |
| 5 | 18.1 | 1 |
| 6 | 17.0 | .5 |
| 7 | 17.4 | .5 |
| 8 | 18.3 | 1 |

| PROCESSOR LOGIC | 204 |
|---|---|
| 1 | PENDING |
| 2 | PENDING |
| 3 | PENDING |
| 4 | EXECUTE 3 |
| 1 | PENDING |
| 2 | PENDING |
| 4 | EXECUTE 2 |

PERFORMANCE AND POWER MANAGEMENT FOR ROTATING DATA STORAGE DEVICE

SUMMARY

A data storage system may generally be capable of reading and writing data in various data storage environments.

In accordance with some embodiments, a data storage device may have a data storage medium and a processor that is configured to skip a first command request and execute a second command request in response to the second command request having an access latency within a first predetermined performance impact range and a power consumption within a second predetermined power savings range compared to the first command request.

BRIEF DESCRIPTION OF THE DRAWINGS

FIG. 1 is a block representation of an example data storage system configured and operated in accordance with some embodiments.

FIG. 2 displays a block representation of portions of an example data storage device capable of being used in the data storage system of FIG. 1.

FIG. 3 shows portions of an example data storage device configured and operated in accordance with various embodiments.

FIG. 4 illustrates portions of example data storage device configured and operated in accordance with some embodiments.

DETAILED DESCRIPTION

Figures 5, 6:
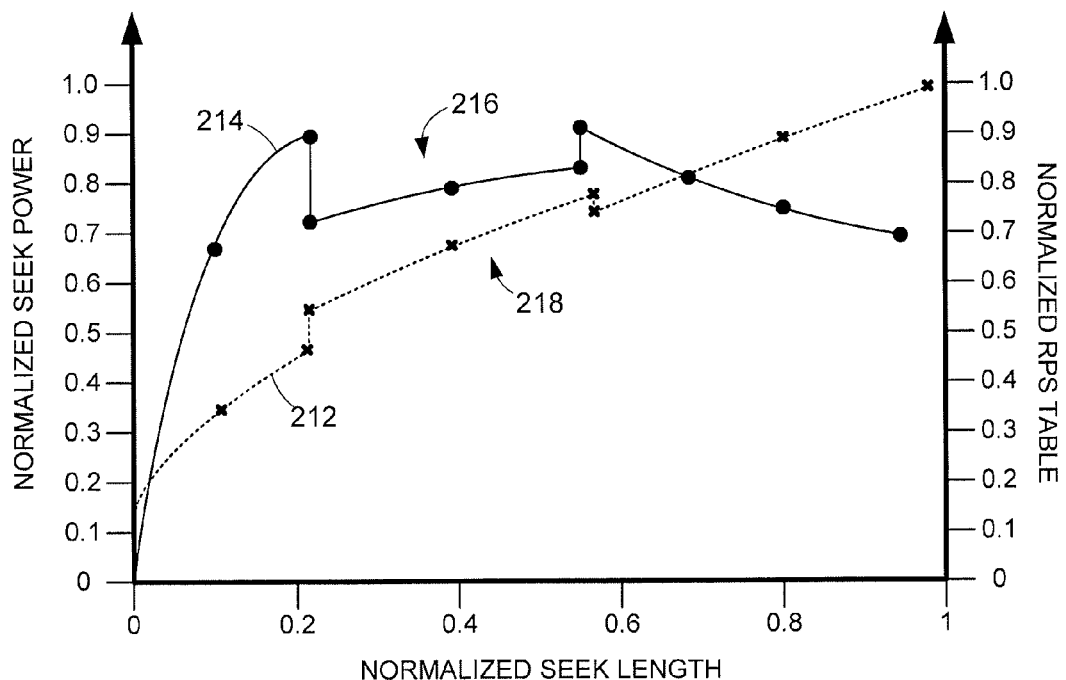
FIG. 5 provides portions of an example data storage device configured and operated in accordance with various embodiments.
FIG. 6 displays example operational data that may be experienced by a data storage device in some embodiments.

With mobile electronics employing more sophisticated data storage, processing, and hardware configurations, power consumption has become a metric that differentiates products in the marketplace. A mobile device like a laptop, tablet, and smartphone can realize direct fiscal benefits relative to total cost of ownership by reducing power consumption and prolonging battery life. However, the proliferation of power intensive high resolution displays, multi-core processors, and data intensive software has made power conservation difficult. Such issues correspond with continued industry emphasis on reducing power consumption in mobile electronics without degrading performance.

Accordingly, a mobile electronics device may have a processor that is configured to skip a first command request and execute a second command request in response to the second command request having access latency within a first predetermined performance impact range and power consumption within a second predetermined power savings range compared to the first command request. The evaluation of pending command requests in terms of performance impact and power consumption can provide an operating balance while evaluation of a pending command request's access latency against a predetermined range can ensure the ability of the system to service intensive processing operations often encountered in mobile electronics devices.

FIG. 1 displays a block representation of an example data storage system 100 that may be implemented in a mobile environment in accordance with various embodiments. The data storage system 100 is shown in a non-limiting configuration with a data storage device 102, such as the portion shown in FIG. 1, being equipped with a transducing head 104 that may have at least one data reading and writing means that can respectively be positioned over a variety of locations on a magnetic storage medium 106, such as over one or more stored data bits 108 organized in a predetermined pattern 110 like concentric data tracks and bit pattern media. The storage medium 106 can be attached to one or more spindle motors 112 that rotate the medium 108 to produce an air bearing 114 on which the transducing head 104 flies to access predetermined portion of the medium 106. In this way, one or more local 116 and remote 118 processors can provide controlled motion of the transducing head 104 and spindle 112 to adjust and align the transducing head 104 with selected data bits 108.

The advent of wireless computing has allowed remote processor 118 and storage array 120 access to a controller 122 via a network 124. The remote 118 and local 116 processors can act independently or concurrently to monitor and control one or more sensors 126 that continuously or sporadically provide operating conditions of the data storage medium 106, like vibration and temperature, as well as the spindle 112, such as rotational speed and power consumption. The local 116 and remote 118 processors may further populate, organize, and execute command requests in a memory buffer 128 that can be configured as volatile and non-volatile memory cells to provide temporary storage of data and data information that are pending for execution by the data storage device 102 and controller 122.

FIG. 2 generally illustrates a block representation of various portions of an example data storage device 140 configured in accordance with some embodiments. A memory buffer 142, such as buffer 128 of FIG. 1, may be present in temporary and permanent storage locations that are controlled by at least one processor and/or controller to establish a command queue of read and write requests 144, 146, 148, 150, 152, 154, and 156, as shown. The command queue can be organized in an unlimited variety of manners, such as first in first out (FIFO), by size, by access times, by error rates, by logical block address (LBA), and by physical block address (PBA), of the requests in association with at least one associated data storage medium 158.

While groupings of data write and read requests may be present in the command queue with LBAs in close physical proximity on the data storage medium 158, such command queue condition is rare. More commonly, a wide variety of physical locations are to be accessed by the requests in the command queue, similar to the diverse physical locations shown on medium 158. Such a variety of physical data access locations corresponds with transducer seeks with increased data access times and power usage. Through monitored execution of previously pending data requests, prediction circuitry, that may be present in one or more processors and controllers, can conduct prediction logic 160 where data requests are logged in step 162 at least for access latency and power consumed during data request execution.

Step 162 may continuously or sporadically log data request execution from the buffer 142 before the logged metrics are sent to a model generator in step 164. The model generator may apply one or more analysis and prediction algorithms to identify patterns, trends, and correlations between pending data requests and executed access latencies and power consumption. For example, read request execution to a first portion of the data storage medium 158 followed by write request execution to a different second portion that corresponds to a long transducer seek time may have a predictable execution time (access latency) and power consumption. Such model predictions can subsequently be outputted by step 166 to be used to refine the command queue present in the buffer 142 to optimize data storage device 140 performance without wasting power.

The predicted results from step 166 may convey that the highest power consuming data storage device 140 modes arise during random access data request execution that correspond to a high seek duty cycle where sizable current is used to deliver the data transducing means in a timely manner. When such random access data requests are executed with minimal data requests pending in the buffer 142, such as eight or less, excess rotational latency of the data medium 148 can lower the amount of power consumed by a data request without affecting data access time. However, the logged data from step 162 and predicted results from step 166 would reveal that large amounts of pending data requests in the buffer 142, such as fifteen or more, can minimize data medium 158 excess rotational latency as data requests are continuously executed with little downtime.

The identification of such power and performance models through logic 160 can predict the inefficiency of power consumption reducing methodology like VJIT (Variable Just In Time) data request execution. The use of large amounts of buffered data streaming, downloading, and uploading operations can maintain a large command queue depth, which renders power consumption reducing models that factor queue depth with power consumption ineffective due to power conservation being given priority over data access times in data storage and retrieval operations. As such, the predicted and logged data request information from logic 160 can be used to balance pending data request execution time against power consumption to provide optimized device performance regardless of the command queue depth in the buffer 142.

FIG. 3 provides portion of an example data storage device 180 when command queue organization and execution techniques are carried out in accordance with various embodiments. A command queue 182 is displayed with pending command requests that have been evaluated to predict power consumption of the various requests and organize the requests by ascending predicted access latency. Different versions of the command queue 182 may be present in multiple different memory buffers as the command requests are populated, evaluated, and organized. That is, a first buffer could be a first type of memory, like solid state memory, that populates with command requests on a first in first out (FIFO) basis while the sorted queue 182 is present in a different second type of memory to allow fast data request execution.

In contrast to command queue sorting algorithms that attempt to minimize data access times without consideration for power consumption, or vice versa, one or more processors can conduct evaluations like the ones shown in logic 184 that applies a secondary command selection criterion that evaluates the power used by a command request in combination with the predicted access latency. Such a two dimensional analysis of each pending command request provides a balance of power savings and data access performance. The evaluation of both power and access performance can allow a user or host to selectively set, change, and remove operating modes that prioritize or balance the power being used and data access speeds being provided by a data storage device One such non-limiting operating mode can be limiting the maximum sustained operating power being consumed at any one time or over a length of time, such as long as a device is operating on battery power. The power may further be minimized in an example operating mode that executes the lowest predicted power consuming pending command requests that fall below a predetermined power threshold, like 10 Watts, regardless of the data performance impact. Conversely, a user or host can select an operating mode automatically or systematically that prioritizes data performance at the expense of power consumption, such as by executing command requests by predicted access latency.

While prioritizing power consumption or data access times can be performed in a variety of manners and for an unlimited number of reasons, such as to mitigate temperature experienced by a data storage medium and/or data transducer, various operating mode embodiments execute pending command requests to provide a neutral data performance with lower power consumption than if the access latency sorted command queue 182 were executed sequentially. The balance may be implemented in an operating mode that automatically and continuously adjusts power consumption based on host-level loading, such as data streaming that need higher data throughput than low processing intensive applications.

The ability to modify mode parameters like maximum power consumption and minimum data access times allows a user and host to adapt to changing conditions. For example, mobile electronics operating conditions, such as battery power, can be accommodated by providing a seamless balance of data request execution time and power consumption. Such ability can further provide a greater benefit to device performance than command queue modes that rely on queue depth to determine command request organization and execution order. Specifically, balancing pending command request data access times with power consumption can take advantage of increased granularity of a high command queue depth to select slightly slower commands to provide large power savings and lower average power consumed over time.

In a thermal mitigation command queue operation mode, such balance of request access time and power consumed allows fast, short seeks to execute unencumbered while slow or high power seeks are skipped, which maintains data storage device operation while mitigating temperature elevation. This balance contrasts thermal mitigation schemes that apply uniform delays to all executed command requests, which can limit data storage device capabilities, especially in processing intensive data streaming conditions.

A balance of command request access time and power consumption can have ranges set by users and host that determine the level of power savings and corresponding maximum amount of access time allowed to provide such power savings. As shown in processor logic 184 in FIG. 3, the fastest estimated command request is initially evaluated against the second fastest command request. It should be noted that the predicted access latency may be based on seek time as well as seek length lookup time. The processor and/or controller performing the logic 184 may then set command request 1 as the current selection with a nominal expected access time and power consumption before comparing the expected access time of the current selection with the next command request from command queue 182.

The comparison of the first and second command requests can be conducted with any number of operational and biographical command request actual and predicted values, but some embodiments analyze the access latency of the two command requests to determine if the difference is within the user-defined maximum performance impact range. In the event the second command request falls outside that range, the logic 184 would execute the current selection. Alternatively, a latency difference in the command requests within the predetermined impact range would then evaluate the respective requests for the amount of power being saved. If the difference in predicted power usage of the command requests is greater than the user-defined minimum power benefit range, the first command request is skip and the second command request is designated the current selection to be evaluated against other pending command requests.

With the second command request having smaller power usage than the first command request, but a lower power saving than the user-defined minimum power benefit, the first command request remains the current selection. Such evaluation of not only the existence of power savings between the command requests, but that the power savings are greater than a predetermined range allows data performance to remain high as the faster command request is executed despite a potential power savings associated with the second command request. This execution of a sub-optimal power consuming command request differs from command queue schemes that exclusively execute command requests based on the presence of power savings and schemes that evaluate data access times only in certain queue depth situations, which can be rendered ineffective in queue depths that are continuously greater than ten pending requests.

By using the user-defined performance impact and power benefit ranges, logic 184 successively identifies command requests two and three as having the prerequisite balance of access speed and power savings. As a result, command requests one and two are skipped and evaluated later as the third request is designated the current selection for comparison with the fourth command request. Command queue 182 illustrates how the fourth command request fails to provide a small enough access speed impact to which the logic 184 responds by executing the current selection despite the fourth command request having the smaller power requirement.

Command request three execution returns logic 184 to the skipped command requests one and two for re-evaluation with respect to the user-defined ranges, which might have changed subsequent to the previous analysis. In a scenario where no requests are skipped or when all skipped requests have been executed, evaluations can be undertaken between existing and repopulated command requests in the command queue 182. The example data storage device 190 of FIG. 4 displays a command queue 192 and processor logic 194 with different command requests and user-defined performance and power ranges.

In accordance with some embodiments, the first through third fastest access latency command requests are successively executed prior to request four through seven being skipped on account of each request providing sufficient speed and power characteristics to satisfy the user-defined ranges. Processor logic 194 illustrates how the user-defined speed and power ranges can be used to dictate the balance between data access speed and power consumption, which can result in command request eight being executed before command requests four through seven are subsequently re-evaluated.

While separate access latency and power consumption evaluations can be made, as shown in FIGS. 3 and 4, various embodiments merge the latency and power functions into a single performance metric. FIG. 5 provides an example data storage device 200 employing such a combined performance metric in command queue 202 and processor logic 204. The combination of multiple criteria into a single performance metric is not limited and may include any number of operational and biographical request information, such as size of sector to be read or written. Regardless of the number of criteria being combined, the single performance metric allows for normalization and corrective values to be applied to provide optimized balance of data request execution speed and power consumption.

Command queue 202 conveys a non-limiting example single performance metric for each pending command request that is computed based at least upon predicted access time and predicted power consumption. While corrective penalty values can be assessed for any number of reasons, such as high seek length and request data size, the embodiment shown in the command queue 202 of FIG. 5 assesses a time penalty for command requests that are predicted to be above predetermined power thresholds like 9 and 10 Watts. That is, the amount of penalty and thresholds which the penalty is assessed can be changed at will.

As shown in the example embodiment of FIG. 5, a 0.5 penalty is assessed to several command requests that each have predicted power consumptions above a first predetermined threshold while a penalty of 1 is assessed to other command requests that exceed a higher second predetermined predicted power consumption threshold. The establishment of thresholds and assessment of penalties does not necessarily change the processor logic 204 where pending command requests are compared and subsequently executed based on the predicted performance metric that includes any assessed penalties. Various embodiments may further establish a minimum performance benefit for the processor logic 204, such as 5%, that ensures a balance of request execution speed and power consumption similar to the logic 184 and 194 of FIGS. 3 and 4.

The assessment of penalties to a single performance metric allows a non-linear seek profile where an RPS algorithm can efficiently compare and execute command requests, which can provide reduced power consumption with minimal loss in data execution speed. The example operational data from performance logic 204 is graphed in FIG. 6 as normalized seek length compared to normalized seek power in segmented line 212 and to normalized RPS table in line 214. The plotted data illustrates predetermined penalty assessment ranges 216 and 218 that each corresponds to penalty thresholds similar to those shown in command queue 202 of FIG. 5. More specifically, the penalty assessment ranges 216 and 218 match the ability of the RPS algorithm to select a penalized performance metric, which corresponds with the execution of sub-optimal command requests through the balanced evaluation of pending command requests.

Through the user-defined designation of access latency and power consumption ranges along with the ability to assess penalties to combinations of command request performance metrics, dynamic control of command queue organization, evaluation, and execution can be provided. Such dynamic control can allow a trade-off of data access execution speed with power consumption when the power consumption of an evaluated pending command request is large enough and the associated execution speed is within an allowable performance impact range. The dynamic control of command queue organization and execution further negates the effects of a changing command queue depth as each command request is evaluated for performance and power consumption regardless of the number of command requests in the queue.

Figure 7:
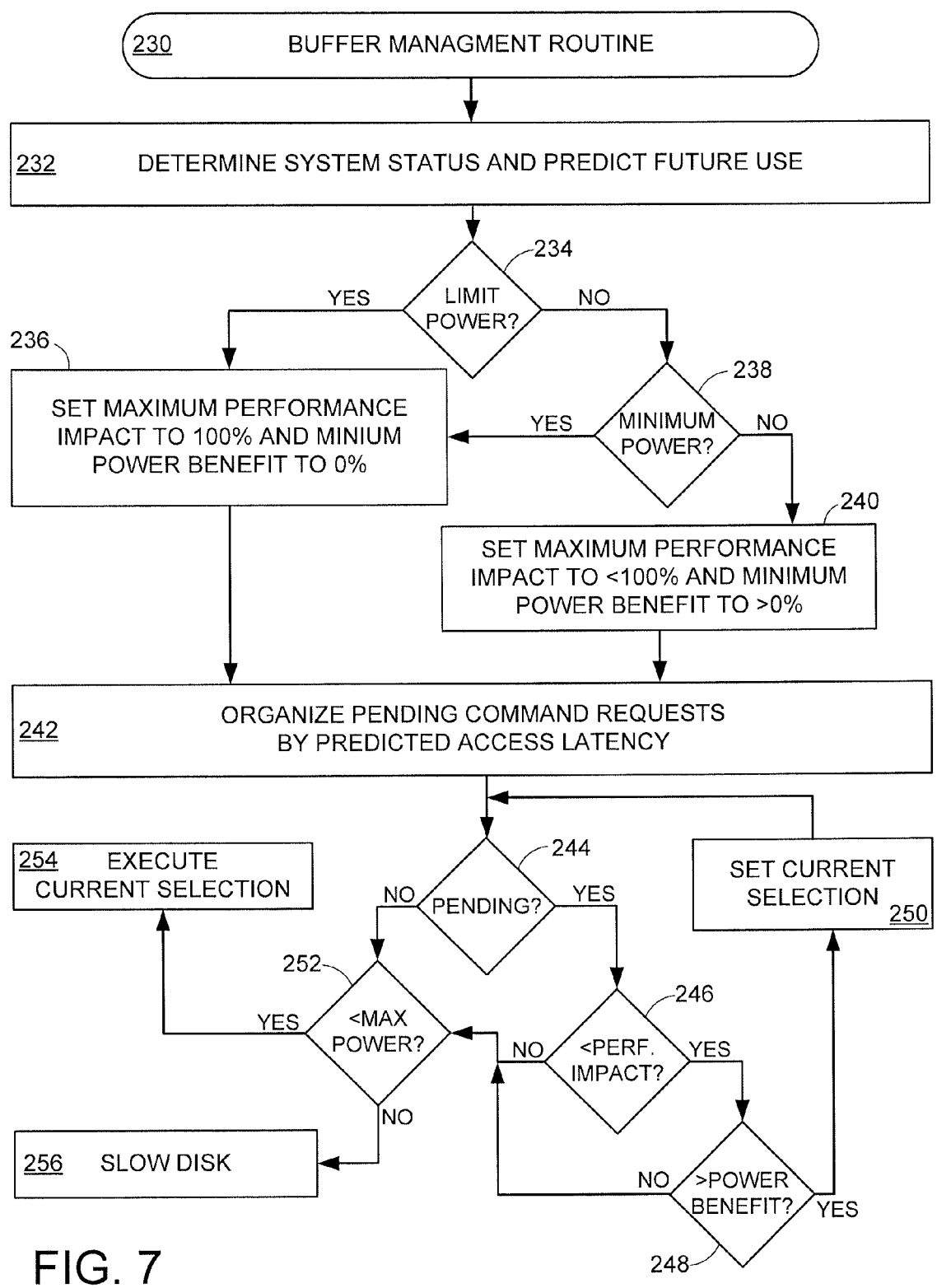
FIG. 7 provides a flowchart of an example buffer management routine carried out in accordance with various embodiments.

FIG. 7 is an example buffer management routine 230 that can be conducted in accordance with various embodiments to provide command queue organization, evaluation, and execution with a balance of power consumption and request access speed. The routine 230 may initially determine a data storage system or mobile electronics system status and predict future use and needs in step 232. For example, step 232 may recognize a system is being powered exclusively with battery power or conducting processing and data intensive software that corresponds with high command request execution speed at the expense of greater power consumption. Conversely, step 232 may identify a stand-by mode has been entered for the system and predict low data performance use and need that corresponds with prioritizing power savings over command request access latency.

Decision 234 next evaluates if maximum sustained power for the system is to be limited. Setting a maximum sustained power can allow a user and host to ensure no command request execution, or aggregate of multiple request executions, will exceed a predetermined maximum power consumption for a given time or over a period of time. If a maximum sustained power is to be set, step 236 coincides with a user and/or host setting a maximum allowed power consumption and potentially a time frame which the average power consumption cannot exceed. Step 236 further sets a maximum performance impact to 100% and minimum power benefit to 0, which corresponds with the prioritization of command requests having reduced power consumption over requests with faster access latency.

Step 236 is also engaged if the system is to be put in an energy conservation operating mode where power consumption is minimized from decision 238. For clarification, decision 234 may or may not set a maximum allowable power consumption threshold and both decision 234 and 236 can set maximum performance impact to 100% and minimum power benefit to 0. In the event a power conservation mode is not chosen from decision 238, step 240 allows a user and/or host to set ranges for both maximum performance impact and minimum power benefit, which allows a balanced trade-off between power and performance that can be tuned to match the system's operating condition and the user's will.

Regardless of the performance impact and power benefit ranges set by either steps 236 or 240, step 242 subsequently populates and organizes pending command requests in a command queue by predicted access latency. It should be understood that various command requests are evaluated by a model generator that may apply existing logged command request data as well as prediction algorithms to estimate at least the command request's power consumption and access latency. The establishment of a command queue organized by ascending predicted command request access latencies then advances routine 230 to decision 244 where the presence of a pending command request is evaluated and a current selection is set to the first pending command request if one is available.

The presence of a pending, unexecuted command request further proceeds to decision 246 and the comparison of the current selection command request with the next available command request in regard to potential performance impact. That is, the difference in performance impact of the current selection and the next available command request is evaluated in decision 246 for compliance with the allowable performance impact range that was set in either step 236 or 240. Compliance with the allowable performance impact range then has decision 248 evaluate the difference in power consumption between the current selection and the next available command request for compliance with the predetermined power benefit range.

A difference between command request power consumption that lies within the power benefit range passes from decision 248 to step 250 where the command request with access latency and power consumption within the predetermined ranges compared to the current selection is set as the new current selection before decision 244 is re-evaluated to see if any pending command requests are present. In other words, compliance with the predetermined performance and power ranges in decisions 246 and 248 results in step 250 skipping the prior current selection and setting a new command request with that moniker. It can be appreciated that decisions 244, 246, and 248 along with step 250 can be performed any number of times to successively skip command requests in favor of other requests complying with the predetermined performance and power ranges.

A failure of a command request to comply with the predetermined performance and power ranges from either decision 246 and 248 begins decision 252 where execution of the current selection is evaluated against a maximum allowed power threshold that may have been set in step 236. If the current selection has a predicted execution power consumption that is less than the allowable max power or if no maximum power threshold is set, step 254 next executes the current selection. However, if the maximum power threshold is exceeded, step 256 proceeds to reduce the spinning rotation of the data storage medium to potentially allow one or more pending command requests to be executed while the spindle motor is consuming less power.

In various embodiments, the reduced data medium rotation of step 256 corresponds with re-evaluation of all pending command requests in the command queue with different predicted power consumption information associated with the decreased power consumption by the spindle motor. Hence, routine 230 may be altered to proceed from step 256 back to decision 244 for further analysis. Other embodiments use step 256 to slow disk rotation as part of an operational sleep mode where no command requests are executed or only data from one or more memory cache are loaded, which can be particularly useful when routine 230 is purposed with mitigating temperature elevation in a data storage device. As such, the management routine 230 is not limited to the steps, decisions, and organization shown in FIG. 7 as various aspects of the routine 230 may be added, modified, and removed without limitation.

Through the assorted embodiments described herein, a command queue can be organized, evaluated, and executed with a balance of data access performance and power consumption to optimize data storage systems, particularly in mobile electronics environments. The ability for a user to define power and data access performance ranges for command requests to be compared allows command requests to be executed with a balance of power and performance. Moreover, the comparison of command requests based on user-defined ranges allows for the execution of sub-optimal command requests for either power consumption or data access speed at the expense of providing concurrent power savings and minimally reduced access speed, which can optimize command queue execution regardless of queue depth.

It will be appreciated that the technology described above can readily be utilized in any number of applications, including solid state memory. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising:
   a buffer storing a plurality of command requests pending for a data storage medium; and
   a processor configured to skip a first command request and execute a second command request in response to a prediction of a model generator that the second command request will have an access latency within a predetermined performance impact range and a power consumption within a predetermined power savings range compared to the first command request, the model generator configured to predict access latency and power consumption values based on prior logged command request execution.

2. The apparatus of claim 1, wherein the buffer is non-volatile memory in a data storage device.

3. The apparatus of claim 1, wherein the processor is remote and a controller is local, the processor connected to the controller over a wireless network.

4. The apparatus of claim 1, wherein the processor and buffer are each present in a mobile electronic device powered by a battery.

5. A method comprising:
   storing a plurality of command requests pending for a data storage medium in a buffer; and
   comparing a first command request to a second command request;
   predicting access latency and power consumption values for the respective first and second command requests based on prior logged command request execution; and
   skipping the first command request and executing the second command request with a processor in response to the predicted second command request access latency and power consumption values, the access latency value being within a predetermined performance impact range and the power consumption being within a predetermined power savings range.

6. The method of claim 5, wherein the command requests are initially organized in the buffer in ascending access latency.

7. The method of claim 5, wherein the access latency and power consumption are each predicted for the first and second command requests from a model generator.

8. The method of claim 7, wherein the predicted access latency and power consumption are combined into a performance metric.

9. The method of claim 8, wherein a penalty is assessed to at least one of the plurality of command requests in response to the predicted power consumption of a command request being greater than a penalty threshold.

10. The method of claim 5, wherein the prediction is based on prior logged write and read command request execution to the data storage medium.

11. The method of claim 5, wherein the first command request has greater power consumption than the second command request.

12. The method of claim 5, wherein the second command request has a slower access latency than the first command request.

13. The method of claim 5, wherein the plurality of command requests have both data write and data read requests.

14. The method of claim 5, wherein the predetermined performance impact and power be savings ranges are defined by a user.

15. The method of claim 14, wherein the user defines a maximum performance impact range of 10%.

16. The method of claim 14, wherein the user defines a minimum power savings range of 5%.

17. A method comprising:
    storing a plurality of command requests pending for a data storage medium in a buffer; and
    comparing a first command request to a second command request;
    predicting access latency and power consumption values for the respective first and second command requests based on prior logged command request execution;
    skipping the first command request and executing the second command request with a processor in response to the predicted second command request access latency and power consumption values, the access latency value being within a predetermined performance impact range and the power consumption being within a predetermined power savings range; and
    monitoring temperature of the data storage medium.

18. The method of claim 17, wherein the predetermined performance impact range and power savings ranges are respectively modified in response to the monitored temperature of the data storage medium.

19. The method of claim 17, wherein the skipping step skips both the first and second command request and executes a third command request of the plurality of command requests, the third command request having a lower power consumption than the first or second command requests.

20. The method of claim 17, wherein the processor reduces a rotational speed of the data storage medium in response to the first and second command requests exceeding a user-defined maximum allowable power consumption threshold.

* * * * *

UNITED STATES PATENT AND TRADEMARK OFFICE
CERTIFICATE OF CORRECTION

| | |
|---|---|
| PATENT NO. | : 9,075,538 B2 |
| APPLICATION NO. | : 13/925529 |
| DATED | : July 7, 2015 |
| INVENTOR(S) | : Christopher Ryan Fulkerson, Lingzhi Yang and Kenneth Lawrence Barham |

It is certified that error appears in the above-identified patent and that said Letters Patent is hereby corrected as shown below:

In the claims:

In Col. 10, claim 14, line 14
delete "be"

Signed and Sealed this
Twelfth Day of April, 2016

Michelle K. Lee
*Director of the United States Patent and Trademark Office*